United States Patent [19]

Quenneville

[11] Patent Number: 5,419,420
[45] Date of Patent: May 30, 1995

[54] FLYWEIGHT ACTUATED CLUTCH

[75] Inventor: Raymond N. Quenneville, Suffield, Conn.

[73] Assignee: United Technologies, Corp., Hartford, Conn.

[21] Appl. No.: 210,817

[22] Filed: Mar. 18, 1994

Related U.S. Application Data

[63] Continuation-in-part of Ser. No. 957,343, Oct. 5, 1992, abandoned.

[51] Int. Cl.$^6$ ............................................. F16D 43/06
[52] U.S. Cl. .................................. 192/103 A; 74/7 C
[58] Field of Search ........... 192/103 A, 104 R, 106 R, 192/63; 74/7 C

[56]  References Cited

U.S. PATENT DOCUMENTS

| | | | |
|---|---|---|---|
| 2,464,675 | 3/1949 | Dodge | 192/104 R |
| 2,587,712 | 3/1952 | Dodge | 192/103 A |
| 2,720,299 | 10/1955 | Niemela | 192/104 R |
| 2,948,373 | 8/1960 | Schild | 192/106 R X |
| 4,114,746 | 9/1978 | Usui et al. | 192/104 R |
| 4,805,470 | 2/1989 | Woodruff | 192/104 R X |

FOREIGN PATENT DOCUMENTS

| | | | |
|---|---|---|---|
| 866046 | 4/1961 | United Kingdom | 192/104 R |
| 1497413 | 6/1989 | U.S.S.R. | |

Primary Examiner—Rodney H. Bonck
Attorney, Agent, or Firm—William W. Jones

[57] ABSTRACT

The clutch is adapted for use in starting and restarting aircraft turbine engines with a pneumatically operated starter turbine. The clutch assembly has one clutch member which is driven by the starter turbine and another clutch member which is connected to and drives the turbine engine. The starter turbine clutch member is translationally moveable toward and away from the turbine engine clutch member. Centrifugally operated flyweights are used to induce the translational movement of the clutch member. Proengagement flyweights are operable when the starter turbine is rotating to urge the starter turbine clutch member toward the turbine engine clutch member; and disengagement flyweights are operable when the turbine engine is rotating to urge the starter turbine clutch member away from the turbine engine clutch member. The mass of the proengagement flyweights is preferably twice that of the disengagement flyweights to provide increased proengagement forces so that the starter turbine clutch member will be forced into extended ratcheting engagement with the turbine engine clutch member during turbine engine restart. Angled splines are used to positively twist the starter turbine clutch member into full engagement with the turbine engine clutch member once the rotational speed of both starter turbine and turbine engine are essentially equal during restart. A rotating stop surface is provided to resist axial forces imposed on the engaged clutch members during driving engagement to allow the higher proengagement forces without incurring bearing damage.

6 Claims, 5 Drawing Sheets

FLYWEIGHT ACTUATED CLUTCH

This is a continuation-in-part of U.S. Ser. No. 07/957,343, filed Oct. 5, 1992.

TECHNICAL FIELD

The present invention relates generally to clutches for use on unidirectional drive systems, and more specifically to a fly-ball actuated clutch particularly suitable for use in a starter for starting engines, such as aircraft turbine engines.

BACKGROUND ART

Clutches are commonly utilized in unidirectional drive systems for transmitting drive torque from a drive shaft to a driven shaft. For example, starters of the type commonly used to start engines, in particular the turbine engines of modern gas turbine powered aircraft, often employ a pawl and ratchet type clutch which functions to transmit rotational drive torque from a drive shaft of the starter to drive the engine being started to starting speed. One type of starter often employing a pawl and ratchet clutch is the pneumatic starter, also known as an air turbine starter, such as disclosed, for example, in U.S. Pat. Nos. 3,727,733; 4,899,534; 4,914,906; and 4,926,631.

A pawl and ratchet clutch of the type commonly used in such pneumatic starters includes a toothed ratchet member mounted on a central drive shaft and a plurality of pivotal pawls supported from and rotating with a driven output shaft disposed coaxially about the drive shaft. The pawls are operatively disposed at circumferentially spaced intervals about the ratchet member in cooperative relationship therewith. Each pawl is biased to pivot radially inwardly by a leaf spring operatively associated therewith to engage a tooth of the ratchet member thereby coupling the drive shaft in driving relationship to the driven output shaft so long as the pawls remain engaged with the teeth of the ratchet member. The drive shaft is connected, either directly or through suitable reduction gearing as desired, to the shaft of the pneumatic starter turbine, which is powered by extracting energy from a flow of pressurized fluid passed through the turbine of the starter.

To start the turbine engine, the output end of the driven output shaft of the starter is connected, for example by mating splines, to an engine shaft operatively connected to the main engine shaft through a gear box, and pressurized fluid, typically compressed air, is passed through the turbine of the pneumatic starter. As the starter turbine extracts energy from the compressed air passing therethrough, the drive shaft of the starter turbine is rotated to in turn rotatably drive the output shaft of the starter, and consequently the turbine engine shaft connected thereto, through the engagement of the pawls pivotally mounted to the output shaft with the ratchet member mounted to the drive shaft. Typically, the starter is designed to accelerate the engine shaft from zero to a predetermined cut-off speed, typically of about 5000 revolutions per minute, in about one minute or less.

Once engine light-off has occurred and the engine shaft is rotating at the desired cut-off speed, the flow of pressurized air to the starter turbine is terminated. With the flow of pressurized air to the starter turbine shut-off, the drive shaft of the starter rapidly slows down. Consequently, the ratchet member mounted to the starter drive shaft also rapidly slows down, while the pawls supported from the starter output shaft continue to rotate with the shaft of the operating turbine engine at the relatively high cut-off speed. The pawls become disengaged from the ratchet member when the rotational speed of the output shaft exceeds a threshold speed whereat the pawls lift-off of the ratchet member, that is pivot radially outwardly out of contact with the teeth of the ratchet member, under the influence of the centrifugal forces acting thereon due to the continued rotation of the pawls at the relatively high speed of the engine shaft. The pawls remain disengaged from the ratchet member so long as the rotational speed of the engine shaft remains high enough that the centrifugal forces acting on the pawls exceed the opposing moment imposed on the pawls by the force of the bias springs.

When the turbine engine is later shut-down, the operating speed of the engine shaft of the turbine engine to which the output shaft of the starter is connected decreases as the turbine engine spools down. As the starter output shaft slows down, the centrifugal force on the pawls consequently decreases and the force of each bias spring progressively pivots its associated pawl radially inwardly again toward the ratchet member until each pawl again contacts the ratchet teeth on the nonrotating ratchet member so as to ratchet in a position to allow for reengagement of the clutch. The speed at which the reengagement of the pawls with the ratchet member occurs, commonly referred to as the reengagement speed, is less than the pawl lift-off speed by an amount commonly referred to as the clutch hysteresis.

In pawl and ratchet-type clutches, when reengagement occurs with the ratchet member rotating at too high of a rotational speed relative to the pawls, a crash reengagement occurs which often results in substantial, if not catastrophic, damage to the clutch. Crash reengagement generally takes place when following an aborted turbine start occurring after the turbine has exceeded pawl liftoff speed, the starter is reactivated in an attempt to restart the turbine engine, before the shaft of the turbine engine has spooled down to a speed below that at which pawl reengagement occurs. When air flow to the starter is reinitiated without the pawls and ratchet being engaged, there is no load on the starter and, consequently, the starter shaft and the ratchet member mounted thereto rapidly accelerate to a free running speed which is substantially above the pawl reengagement speed. As the turbine engine continues to spool down to the pawl reengagement speed, the pawls will eventually pivot inwardly, as the centrifugal force urging them outwardly deteriorates, until the pawls recontact the ratchet member. With the ratchet member rotating at a free running speed substantially greater than the speed at which the pawls are rotating, a violent reengagement will take place. To avoid such a crash reengagement, it is customary to delay restart of the turbine engine until it is certain that the turbine engine has slowed down to the point at which the pawls have already reengaged that ratchet member before the starter is reactivated by supplying air flow to the starter turbine.

British Patent No. 866,046 discloses another form of aircraft turbine engine and starter turbine clutch engagement assembly which utilizes radially displaceable balls to both urge engagement and disengagement between the members of the clutch assembly on the engine and starter turbine. The displaceable balls move over complex cam surfaces each having two angularly related portions with different angles of inclination. A spring is also included to bias the clutch members into engagement when the starter turbine and turbine engine are at rest. When the starter turbine is started, the engagement balls will move radially out to a clutch-engagement locking position which will effectively lock the starter turbine clutch member to the turbine engine clutch member. This clutch-locked condition will persist until the turbine engine rotation speed exceeds the starter turbine rotation speed due to ignition of the turbine engine. When the turbine engine begins rotation, the disengaging balls will also be thrust radially outwardly, but they will not be able to cause disengagement of the clutch members so long as the turbine engine and starter turbine are rotating at the same speed because of the angle of inclination of the cam surface engaged by the engaging balls. Once the turbine engine speed exceeds the starter turbine speed, the turbine engine clutch component will begin to ratchet over the starter turbine clutch component. This ratcheting action will force the starter turbine clutch component away from the turbine engine clutch component, thus compressing the engagement spring. At this point in time, the engagement balls will be forced out of the engagement position, and the disengagement balls will be able to move out to their disengagement position on their cam surface, whereupon the clutch members will be held in a disengaged relationship. When both engaging and disengaging balls are at the same radius their forces are balanced. When the jaws are engaged, the engaging balls are at a greater radius and therefore exert an engaging force greater than the disengaging force produced by the disengaging balls. The compound cam tracks only increase the axial force at any given rotational speed a feature meant to reduce ratcheting as the engine coasts down to a standstill. The use of the compound cam tracks disclosed in the British reference requires ratcheting action to cause disengagement of the clutch members. Thus, so long as ratcheting is ongoing, the engagement balls will essentially null each other and will not be able to assist in forcing the starter turbine clutch member into engagement with the turbine engine clutch member. This does not create a problem when the turbine engine and starter turbine are started from a rest position. As soon as the differential speed of the engaging balls drops off, the force produced by the disengaging balls will overcome the force of the engaging balls plus the engaging spring force and free running will be achieved.

In the assembly described in the aforesaid British patent, there are an equal number of engagement balls and disengagement balls. In the disengaged position both sets of balls are positioned at the same radius. As long as the disengaging balls are rotating at a greater speed than the engaging balls they will exert more force than the engaging balls. At synchronous speed the ball forces will be balanced. Shortly before synchronous speed is reached the spring will provide the force to start clutch engagement. As soon as axial motion occurs the engaging balls will move to a larger radius and the disengaging ball will move smaller radius. This action causes a snap action to bring the jaws into ratcheting engagement shortly before synchronous speed is achieved. When the starter turbine is restarted as the turbine engine decelerates after flame out, the disengagement balls will be in their outwardmost position so long as the turbine engine is rotating faster than the starter turbine. Reengagement will thus be resisted. Since the mass of the engagement balls is the same as the mass of the disengagement balls, so long as the starter turbine speed is lower than the turbine engine speed, the engagement balls will not be able to force the disengagement balls out of their disengaging positions to allow preengagement ratcheting to begin. At rest the spring holds the clutch in engagement and the ball centrifugal forces are zero. As speed is increased the engaging balls move to a radial position greater than the disengaging balls and add to the engaging force of the spring.

Thus in the British patent clutch assembly, preengagement ratcheting cannot begin until the rotational speed of both the starter turbine and the turbine engine are essentially equal. This result was intentional, and was sought so as to minimize preengagement ratcheting, which was thought to be harmful to the clutch members. Thus a very brief period of ratcheting occurs. This can create a problem in the event that there is some ambient resistance to movement of the clutch members into reengagement, such as dirt, lubrication gum, or the like. In the latter case, a late reengagement can occur which can harm the teeth on the clutch members.

Another problem that occurs with a clutch system of the type shown in the British patent relates to the occurrence of only partial reengagement between the clutch member teeth. The teeth on the clutch members are cut at a 10° angle to the face of the members for ease of manufacturing. In the British patent, there is described a spline assembly which is formed at an angle that is complimentary to the angle of the teeth to prevent disengagement of the teeth when the starter turbine clutch member moves toward the turbine engine clutch member. When the teeth angle and the spline angle only compliment each other, partial tooth reengagement can occur under certain circumstances, and such partial reengagement is undesirable.

It would be desirable to provide a clutch assembly which is not suspectable to partial reengagement, and which facilitates full ratcheting reengagement at higher rotational speeds during restart after flame-out by allowing the reengagement balls to positively contribute to the reengaging force and to force the disengaging balls out of their extreme positions, so that the starter turbine clutch member can move to a ratcheting reengagement position at a lower starter turbine speed.

DISCLOSURE OF INVENTION

It is an object of the present invention to provide a clutch assembly suitable for use in transmitting rotational drive torque from a driving member to a driven member which facilitates full clutch reengagement.

The clutch assembly of the present invention comprises a first clutch member operatively associated with a turbine engine such that the first clutch member rotates with the turbine engine, a second clutch member operatively associated with a starter turbine such that the second clutch member rotates with the starter turbine. The second clutch member is axially displaceable relative to the first clutch member between a first position whereat the clutch members are operatively engaged so as to transmit the rotational drive torque from the starter turbine to the turbine engine and a second position whereat the clutch members are disengaged. First counterweight means are provided for generating a camming force for axially forcing the second clutch member toward the disengaged position. The first counterweight means, which may comprise a plurality of members, for example spherical balls or cylindrical slugs, each disposed in its own race, which are displaceable radially outwardly in response to the rotational speed of the turbine engine so as to generate a disengagement camming force which has a magnitude which varies with the radial position of the first counterweight means and increases as the first counterweight means are displaced further radially outwardly.

The clutch assembly further comprises second counter-weight means for generating a proengagement camming force opposed to said disengagement camming force. The second counterweight means, which also may comprise a plurality of members, for example spherical balls or cylindrical slugs, each disposed in its own race, are displaceable outwardly in response to the rotational speed of the starter turbine to generate a proengagement cam force which moves the second clutch member toward and into engagement with the first clutch member.

The aforementioned and other objects, features and advantages of the present invention will become more apparent in light of the following detailed description of the invention and the embodiment thereof illustrated in the accompanying drawings, wherein:

BEST MODE FOR CARRYING OUT THE INVENITON

Figure 1:
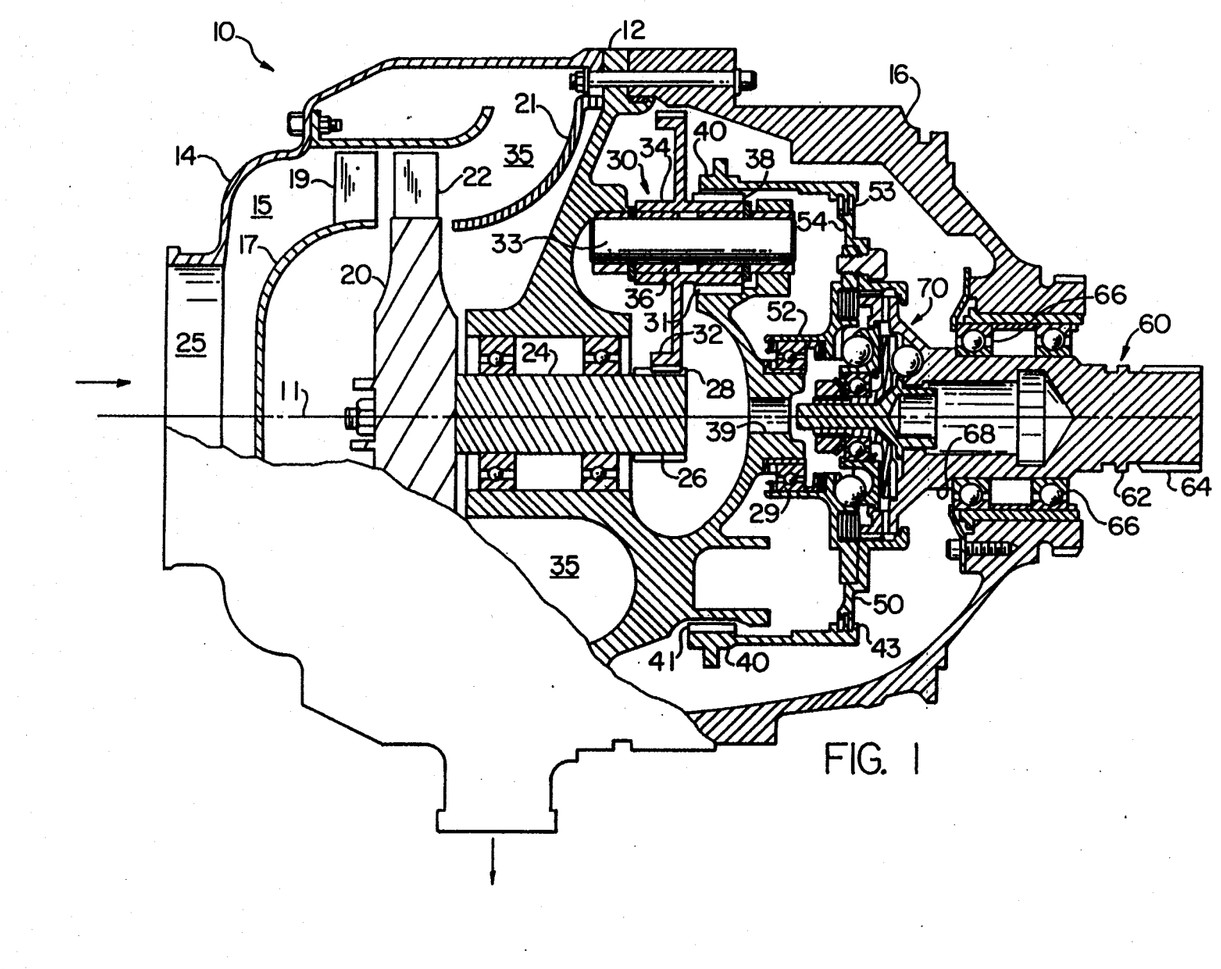
FIG. 1 is a partially-sectioned side elevational view of a pneumatic starter incorporating an embodiment of the clutch assembly of the present invention.

Referring now to FIG. 1, there is depicted therein a pneumatic starter 10 of the general type often utilized to start gas turbine engines, such as for example aircraft turbine engines. The pneumatic starter 10, also known as an air starter turbine, includes a turbine wheel 20 which is driven by a compressed gas, most commonly compressed air from an external supply, passing therethrough so as to extract energy from the gas and convert the extracted energy to mechanical energy in a manner well known in the art. Although the present invention is described herein with reference to an air starter turbine, it is to be understood that the clutch assembly of the present invention has application to any unidirectional drive system wherein a clutch is utilized to transmit rotation from a driving shaft to a driven shaft.

The starter turbine 10 has a gear housing 12 disposed between and mounted to an inlet housing 14 and a transmission housing 16. The inlet housing 14 defines a flow chamber 15 having a axial flow inlet 25 and an annular flow outlet 35. Disposed within the flow chamber 15 intermediate therebetween is turbine wheel 20 having a plurality of blades 22 disposed about its outer circumference and a central axially extending shaft 24. The turbine wheel 20 is mounted to its shaft 24 such that the shaft 24 is driven in rotation about its axis as the turbine wheel 20 is caused to rotate by the compressed air supplied from an external source thereof to the flow inlet 25 and passing through the turbine blades 22 to the flow outlet 35. A turbine shield 17, having a plurality of stator vanes 19 disposed circumferentially thereabout, may be disposed within the flow chamber 15 forward of the turbine wheel 20 to ensure that the incoming compressed air is properly directed through the turbine blades 22 in a desired manner. A flow deflector 21 may be disposed downstream of the turbine wheel 20 to direct the exhaust air from the turbine blades 22 to the flow outlet 35.

The energy extracted from the compressed air via the turbine wheel 20 is transmitted through the turbine shaft 24 to drive one or more planetary gear assemblies 30, for example three gear assemblies disposed at equal circumferentially spaced intervals about the end 26 of the turbine shaft 24. Each planetary gear assembly 30 comprises a drive gear 32 on one end of a central support shaft 34 rotatably supported via bearing means 36, for example roller bearings, on a stationary shaft 33, and on a second gear 38 also provided on the support shaft 34 on the other end thereof. The drive gear 32, the second gear 38 and support shaft 34 may be formed as a single integral member. The drive gear 32 of each gear assembly 30 is operatively connected via intermeshing teeth members to a sun gear 28 provided on end 26 of the turbine shaft 24 and the second gear 38 of each planetary gear assembly 30 is operatively oonnected via intermeshing teeth members to a ring gear 40 disposed coaxially about the axis 11 of the turbine shaft 24.

Extending axially outwardly through a central opening 18 in the transmission housing section 16 of the starter 10 and coaxially along the axis 11 thereof, is an output shaft 60 which has a distal end 62 provided with means, such as for example splines 64, for engaging an engine shaft (not shown) in the gear box of the turbine engine (not shown), such as an aircraft turbine engine, on which the starter 10 is utilized to start the turbine engine. The output shaft 60 is rotatably supported on bearing means 66 disposed in the central opening 18 and carried on housing section 16.

The ring gear 40 has a generally cylindrical member which extends axially about the axis 11. A first set of gear teeth 41 is disposed about the inner circumference of the inboard end of the ring gear 40, which teeth 41 operatively intermesh with the teeth 31 of the second gears 38 of each planetary gear 30. A second set of teeth 43 is disposed about the inner circumference of the outboard end of the ring gear 40, which operatively intermesh with mating teeth of a ring gear carrier 50 disposed coaxially about the axis 11 and supported for rotation about the axis 11 on bearing 29 mounted on a central strut member 39 extending inwardly from the housing 12.

Figure 2:
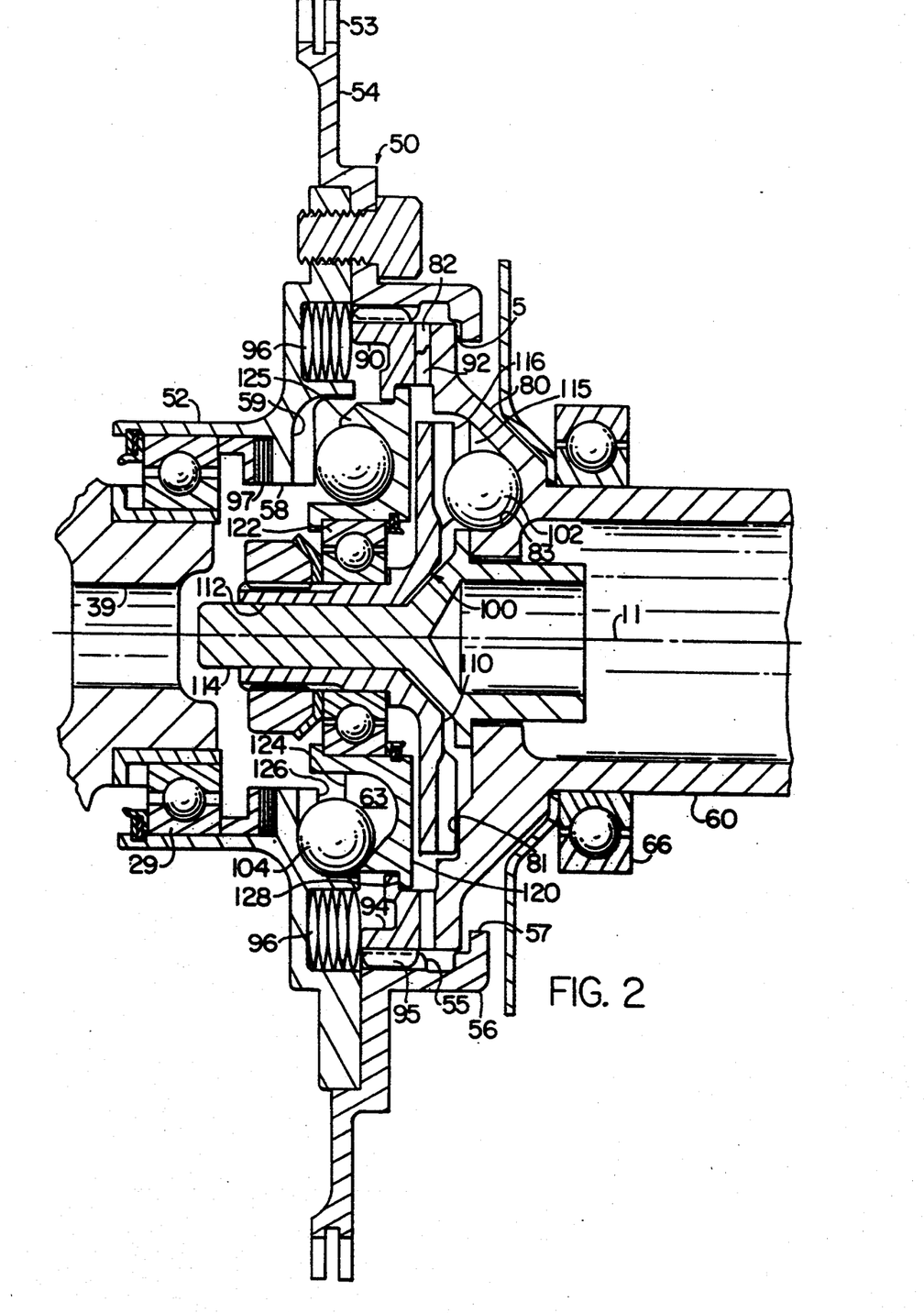
FIG. 2 is a sectional side elevational view of the embodiment of the clutch assembly of the present invention shown in FIG. 1 illustrating the disposition of the clutch assembly at standstill.

Referring now to FIG. 2, the ring gear carrier 50 comprises a first member 52 supported for rotation on the bearing 29 and having a flange portion extending radially outwardly therefrom and second member 54 having a radial flange portion which is mounted to the flange portion of the first member 52 so as to extend radially outwardly therefrom and a generally cylindrical body portion extending axially outwardly therefrom. The outer circumferential portion of the flange of the second member 54 is provided with teeth 53 which operatively intermesh with the teeth 43 of the ring gear 40. Spline teeth 55 which are cut at a 45° helical angle to the axis 11 of the assembly are disposed about the inner circumference of the cylindrical portion 56 of the second member 54 of the ring gear carrier 50.

A clutch assembly 70 is operatively disposed between the ring gear carrier 50 and the output shaft 60. The clutch assembly includes a first clutch member 80 having engagement teeth 82 associated therewith, and second clutch member 90 having engagement teeth 92 associated therewith. The first clutch member 80 is operatively associated with the output shaft 60 whereby the output shaft 60 rotates with the first clutch member 80, while the second clutch member 90 is operatively associated with the drive shaft 24 of the starter turbine 10, whereby the second clutch member 90 is driven in rotation by the drive shaft 24. The engagement teeth 82 of the first clutch member 80 and the engagement teeth 92 of the second clutch member 90 are adapted to engage each other so as to selectively transmit rotational drive torque from the drive shaft 24 to the output shaft 60.

Figure 3:
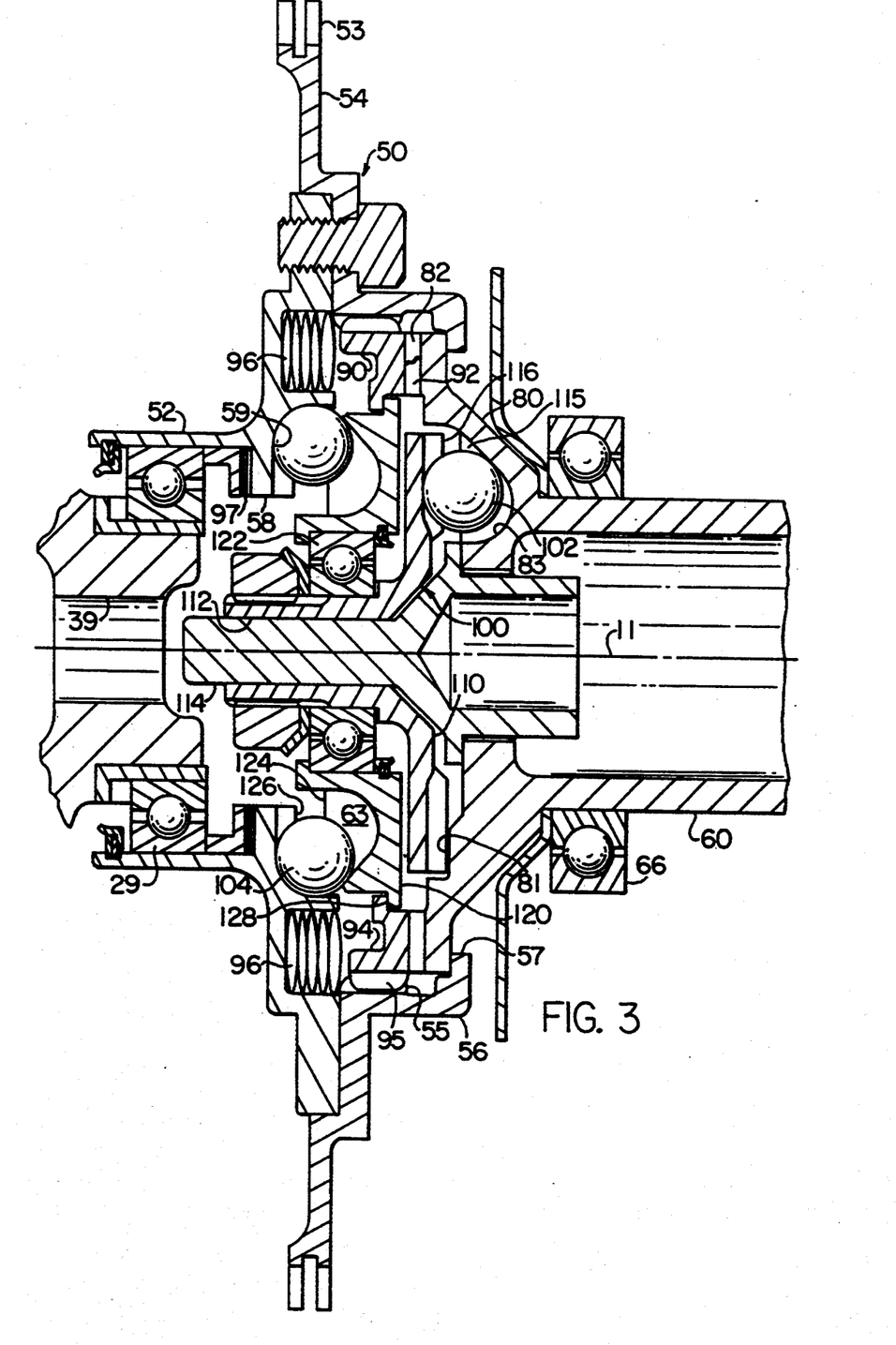
FIG. 3 is a sectional side elevational view of the embodiment of the clutch assembly of the present invention shown in FIG. 1 illustrating the disposition of the clutch assembly while transmitting drive torque.
Figure 4:
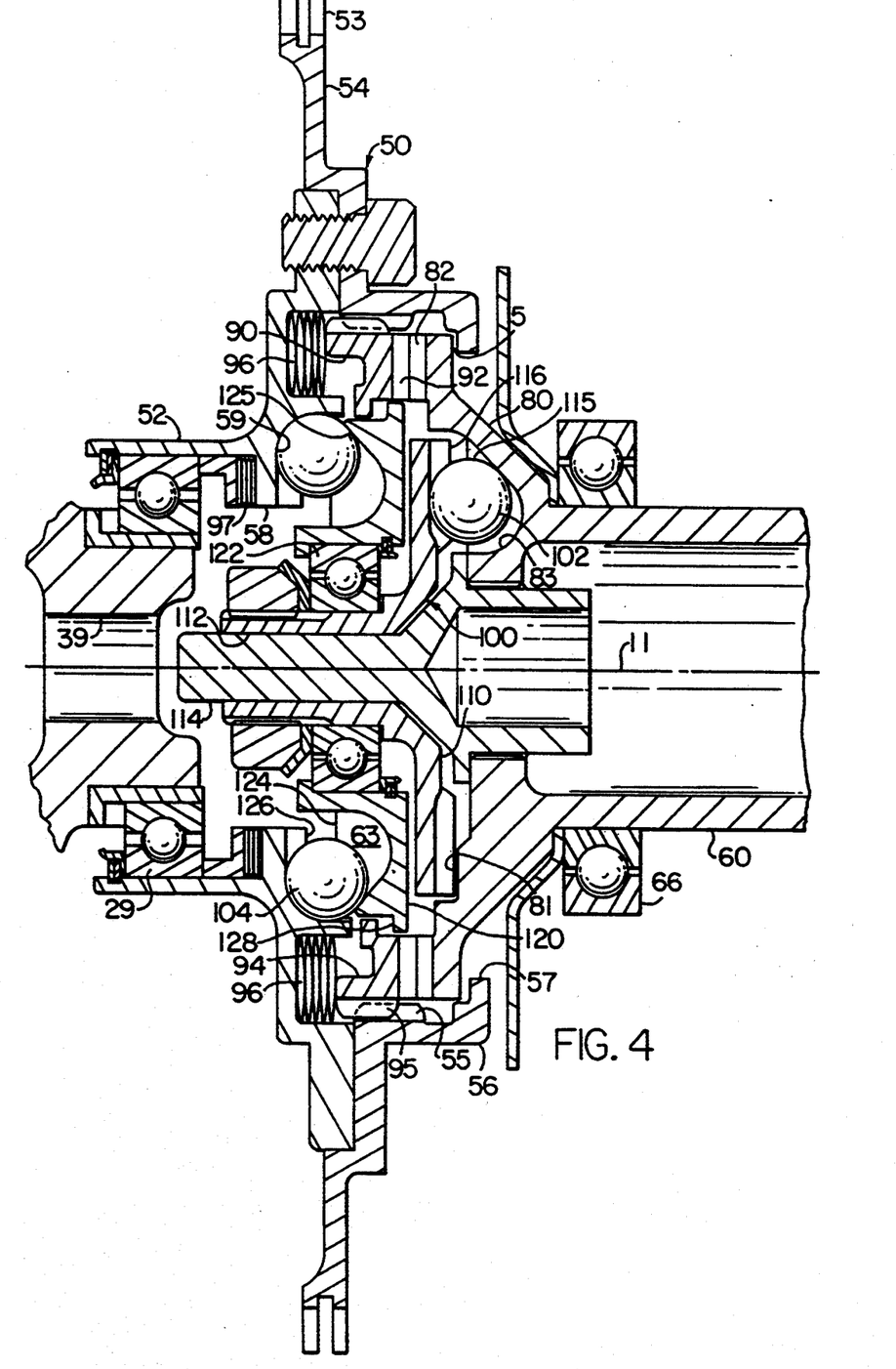
FIG. 4 is a sectional side elevational view of the embodiment of the clutch assembly of the present invention shown in FIG. 1 illustrating the disposition of the clutch assembly at disengagement.

The first clutch member 80, which may be formed integrally with the output shaft 60 or may be a separate member mounted to the output shaft 60, is axially stationary during operation, while the second clutch member 90 is axially displaceable relative to said first clutch member 80 between a first position, as illustrated in FIG. 3, whereat the engagement teeth 92 of the second clutch member 90 is operatively engaged with the engagement teeth 82 of the first clutch member 80 so as to transmit the rotational drive torque from the drive shaft 24 to the output shaft 60, and a second position, as illustrated in FIG. 4, whereat the engagement teeth 92 of the second clutch member 90 is disengaged from the engagement teeth 82 of the first clutch member 80. The second clutch member 90 comprises an annular disc-like member 94 having a set of spline teeth 95 which are cut at an angle of 45° to the axis 11 of the assembly disposed about its outer circumference, and which are adapted to engage with the spine teeth 55 disposed about the inner circumference of a cylindrical flange 56 extending axially outboardly from the flange 54 of the ring gear carrier 50. The spine teeth 95 and 55 form engaging splines which mate when the second clutch member 90 is axially displaced along the flange 54 and driven in rotation with the ring gear carrier 50 which is driven by the drive shaft 24. Since the spline teeth 95 and 55 form a helical spline disposed at a significant angle to the axis 11, preferably about 45° there is ensured full clutch teeth engagement when the turbine shaft 24 is driving the output shaft 60. The clutch teeth 82 and 92 will be cut at an angle of 10° to the assembly axis 11, thus there exists an excess of 35° of thrust-inducing splines that ensure full tooth engagement once ratcheting stops.

A resilient bias means 96 is provided for biasing the second clutch member 90 toward the first clutch member 80 thereby ensuring that the engagement teeth 92 of the second clutch member 90 are in engagement with the engagement teeth 82 of the first clutch member 80 when the clutch assembly is at standstill as illustrated in FIG. 2. The bias means 96 may comprise a wave spring coaxially disposed about the axis 11 and between member 52 of the ring gear carrier 50 and the back side of the second clutch member 90. Additionally, a second resilient bias spring 97 may be provided for biasing the ring gear carrier 50 toward the output shaft 60 thereby assisting the first bias spring 95 by positioning the ring gear carrier 50 outboardly toward the output shaft 60 when the clutch assembly is at standstill.

Referring now to FIGS. 2 through 5, the speed responsive camming assembly 100 comprises first counterweight spheres 102 which are selectively positionable in response to the rotational speed of the output shaft 60 so as to generate a disengagement camming force acting to force the second clutch member 90 away from engagement with the first clutch member 80 as the rotational speed of the output shaft 60 increases; and second counterweight spheres 104 which are also selectively positionable in response to the rotational speed of the turbine shaft 24 so as to generate a proengagement camming force which counteracts the disengagement camming force generated by the first counterweight spheres 102. The engagement camming force increases as the rotational speed of the turbine shaft 24 increases. The assembly 100 also includes means for supporting the disengagement and pro-engagement counterweight spheres 102 and 104, respectively, in operative association with the first and second clutch members 80 and 90.

The support assembly comprises a first support member 110 for supporting the disengagement counterweight spheres 102 and a second support member 120 for supporting the proengagement counterweight spheres 104. The first support member 110 has a cylindrical central portion 112 by which the first support member 110 is slidably mounted to an axially extending stub shaft 114 mounted to or formed integrally with the output shaft 60 so as to rotate therewith; and also has an annular end face extending radially outwardly and disposed in facing relationship to an opposed end face 81 of the first clutch member 80. The first support member 110 is provided with guide tracks 116 in operative association with the opposing end face 81 of the first clutch member 80 to form a plurality of races 115, each of which races 115 provides a path along which the first counterweight spheres 102 travel in response to the speed of the output shaft 60. The end face 81 is provided with pockets 83 formed therein as extensions of the races 115 which pockets are semispherical so as to complement the spheres 102.

The second support member 120 is mounted for rotation relative to the first member 110 on bearing 122 disposed coaxially about the cylindrical portion 112 of the first member 110, and has a radially outwardly extending annular end face 124 disposed in opposed facing relationship to the radially inwardly directed flange member 58 of the ring gear carrier 50. The opposing end face 59 of the flange member 58 of the ring gear carrier 50 is provided with track means 126 which combines with the opposing face of the second member 120 to form a plurality of races 125, each of which races provides a path along which the second counterweight spheres 104 travel in response to the speed of the ring gear carrier 50, which is driven by the starter turbine shaft 24.

The second member 120 is provided with semispherical pockets 63 formed therein as extensions of the races 125. Additionally, the second member 120 has a circumferential flange portion 126 extending radially outwardly from its outer circumferential surface and adapted to abut against an outboardly facing surface of the second clutch member 90.

This invention contemplates an increased proengagement force which is provided by increasing the mass of the proengagement spheres 104 as compared to the disengagement spheres 102. The simplest way to achieve this objective is to use a greater number of proengagement spheres than disengagement spheres. The preferred or best mode of achieving this result is to use twice as many proengagement spheres than disengagement spheres. When this assembly is used, as taught herein, then the proengagement spheres 104 can force the disengagement spheres 102 out of their disengagement positions at a starter turbine speed that is significantly lower than the turbine engine speed. Using the excessive pro-engagement force derived from the excessive proengagement sphere ensures that ratcheting of the starter turbine clutch member and the turbine engine clutch member will begin when the starter turbine is still running at a speed that is several thousand rpms less than the speed of the turbine engine. The ratcheting will continue as the starter turbine gains speed and the turbine engine loses speed. When the two speeds are approximately equal, the first resilient spring means 96 will complete the clutch engagement, and the starter turbine will re-accelerate the turbine engine.

When the clutch assembly of the present invention is at standstill, that is when both the starter turbine shaft 24 and the turbine engine shaft 60 are at rest, i.e. not rotating, as illustrated in FIG. 2, the first flyweight spheres 102 and the second flyweight spheres 104 are both at rest and neither are generating any camming forces. In this condition, the second clutch member 90 is biased forwardly, that is outboardly, by the first resilient spring means 96 such that the engagement means 92 thereof is engaged with the engagement means 82 of the first clutch member 80. A small axial gap 5 will remain between the clutch assembly and the circumferential lip 57 of the ring gear carrier 50.

Upon supplying of motive fluid to the starter turbine, the turbine shaft 24 begins to rotate and rapidly accelerate from rest to a predetermined cut-off speed, typically in the range of 4500 to 6500 revolutions per minute. Whenever torque is applied to drive the turbine shaft 24, as illustrated in FIG. 3, the axial gap 5 is eliminated and the first clutch member 80 is cammed against and supported by the circumferential ring gear carrier lip 57. This camming motion is initiated by outward movement of the flyweights 102 which causes ratcheting engagement of the jaw teeth. When synchronous speed is achieved the forces produced by the 45° spline drive the jaw into full engagement and remove the gap 5. The carrier lip 57 thus stabilizes and reinforces the engaged clutch members 80 and 90 so as to minimize axial loads imposed on bearings 66. The ring gear 40 is thus driven in rotation, which in turn drives the ring gear carrier 50 and the second clutch member 90 which is splined to the ring carrier gear 50 as hereinbefore described. The clutch support provided by the ring gear carrier lip 57 allows the use of the 45° angled splines 55 and 95, which, as previously noted, ensures full engagement between the clutch teeth 82 and 92 once the starter turbine begins to drive the turbine engine. This is an important safety feature of the instant invention.

When the first and second clutch members are engaged in drive relationship, the rotational speed of the first clutch member 80 and the second clutch member 90 are the same throughout the acceleration process. As the clutch members accelerate, both the first flyweight spheres 102 and the second flyweight spheres 104 move radially outwardly in their respective races under the influence of centrifugal forces as illustrated in FIG. 3. By providing the second flyweight spheres 104 with a greater overall mass than the overall mass of the first flyweight spheres 102, for example by selecting more or heavier spheres for the second flyweight than for the first flyweight, the proengagement camming force generated by the outward movement of the second flyweight spheres 104 exceeds the disengagement camming force generated by the outward movement of the first flyweight spheres 102. Having a greater overall mass than the first flyweight spheres 102, the members making up the second flyweight spheres 104 reach the outer extent of their respective races during the acceleration process. As torque builds up, the ring gear carrier 50 is displaced axially rearwardly, i.e. inboardly, against the second bias spring 97, while the first bias spring 96 continues to hold the second clutch member 90 in engagement with the first clutch member 80. As a result of the application of torque, a firm, positive torque transmitting relationship which, as noted is axially stabilized, is maintained throughout the acceleration process until the predetermined cut-off speed is reached at which the clutch members disengage. After the cut-off speed is reached, the clutch members are free running and the flow of motive fluid to the starter turbine is terminated.

Upon termination of the flow of motive fluid to the starter turbine, the turbine shaft 24 rapidly decelerates, while the output shaft 60 continues to rapidly accelerate as it is splined to the shaft of the turbine engine which is lighted-off during the acceleration process. Thus, following cut-off, the engagement teeth 82 of the first clutch member 80 will ratchet along the engagement teeth 92 of the second clutch member 90. As the second clutch member 90 is axially translatable along the ring gear carrier 50, the forces exerted upon the engagement teeth 92 of the second clutch member 90 by the still accelerating engagement teeth 82 of the first clutch member 80 will cause the second clutch member to translate rearwardly against the first bias spring 96 during clutch ratcheting as illustrated in FIG. 4. The engagement teeth 82 and 92 comprise mating surfaces contoured to provide for positive torque transmission when the clutch members are rotating in one direction and to facilitate disengagement when the clutch members are rotating in the opposite direction. The engagement teeth 82 and 92 may comprise helical mating surfaces.

Figure 5:
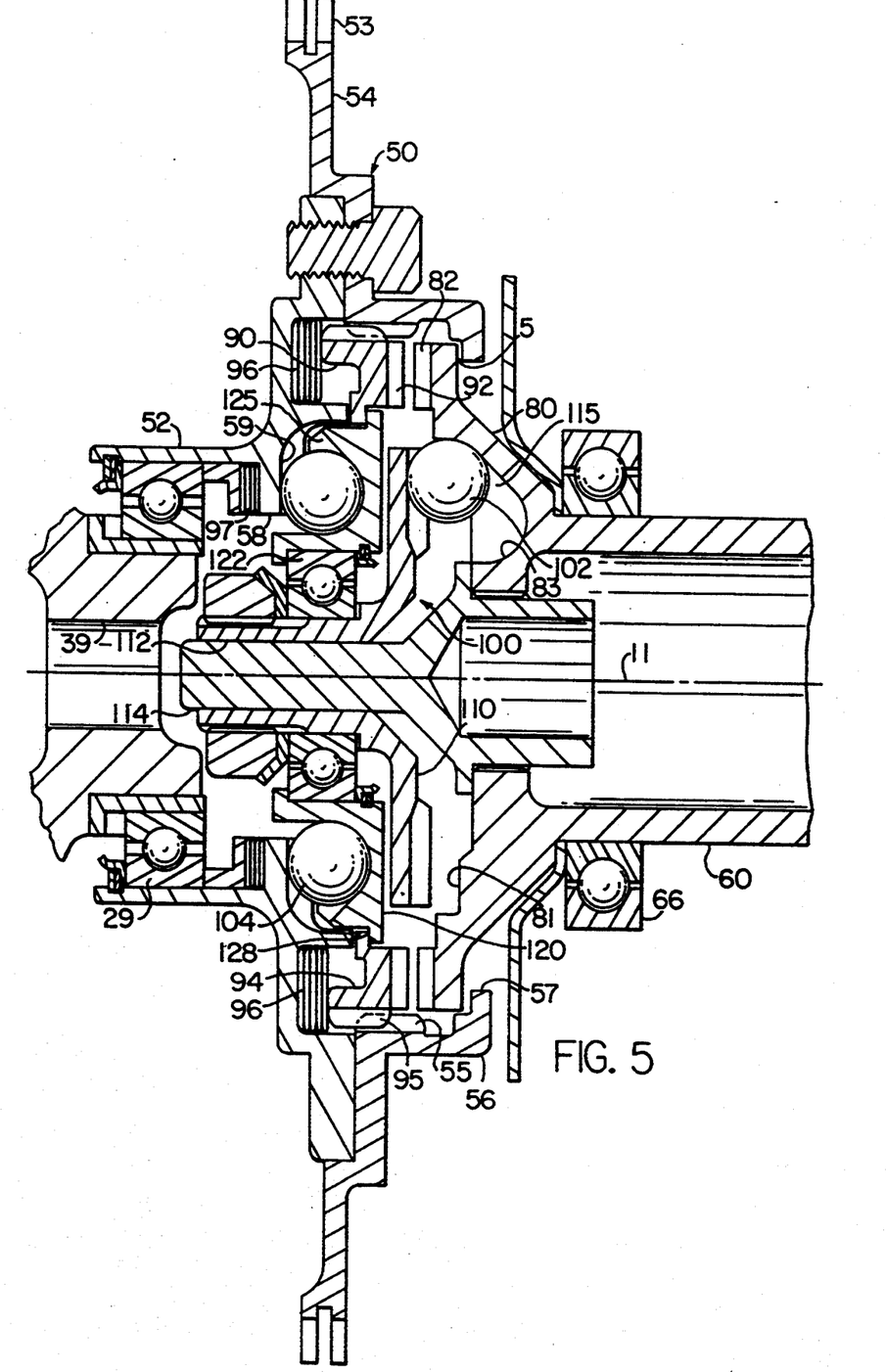
FIG. 5 is a sectional side elevational view of the embodiment of the clutch assembly of the present invention shown in FIG. 1 illustrating the disposition of the clutch assembly while free-running after disengagement.

The first clutch member 80 will continue to ratchet on the second clutch member 90 until the rotational speed of the output shaft 60, which is accelerating with the engine shaft, substantially exceeds, for example by about 4000 revolutions per minute, the rotational speed of the decelerating turbine shaft 24. At that point, the second clutch member 90 is completely disengaged from the first clutch member 80 as illustrated in FIG. 5, and the output shaft 60 is free running, being driven by the engine shaft to which it is connected. In the free running mode, the second clutch member 90 has translated rearwardly, i.e. inboardly away from the first clutch member 80 as the disengagement camming force generated by the first flyweight spheres 102, whose members are continuing to move radially outwardly until they reach the outer extent of their respective races under the influence of the centrifugal forces resulting from the rapidly increasing speed of the output shaft 60 as it accelerates to engine operating speed, typically in the range of about 16,000 rpm, now exceeds the proengagement camming force generated by the second flyweight spheres 104, which force is rapidly decreasing to zero as the turbine shaft 24 rapidly decelerates to zero and the second flyweight spheres 104 return to rest position. As a result, the entire camming assembly 100 translates axially rearwardly under the force exerted thereon by the first flyweight spheres 102, bringing with it the second clutch member 90 which is engaged by the circumferential flange portion 128 extending radially outwardly from the outer circumferential surface of the second member 120 of the camming assembly 100. With the second clutch member so positioned, the first bias spring 96 is compressed and the gap 5 between the clutch assembly and the lip 57 of the ring gear carrier 50 is reestablished.

As previously noted, in the event of an aborted engine start following disengagement, the clutch assembly of the present invention facilitates restart of the engine through the starter without crash engagement of the first and second clutch members of the clutch assembly. In such a case, the output shaft 60 decelerates as the turbine shaft 24 accelerates upon restart of the turbine starter by supplying motive fluid thereto. As the turbine shaft 24 accelerates, the second flyweight spheres 104 again move radially outwardly in their respective races, and force the first flyweight spheres 102 to move radially inwardly in their respective races. Ratcheting will then begin. As previously noted, clutch ratcheting will begin due to the proengagement forces generated by the spheres 104 at starter turbine speeds that are several thousand rpms less than the turbine engine speed. The balls 104 cannot push against the jaw member. The engaging balls push the disengaging balls radially inward and free the jaw so that the spring can engage the jaw member. When the speeds of the first and second clutch members become equal, the camming force exerted by the second flyweight means 104 will quickly push the clutch member 90, which will also be twisted by the splines 55 and 95, rapidly into full tooth engagement with the clutch member 80. The second clutch member 90 is thus brought into torque transmitting reengagement with the first clutch member 80, whereby the torque transmitting relationship from the starter turbine shaft 24 to the output shaft 60 is established without crash engagement, and the restart of the engine to which the output shaft 60 is connected may be reinitiated.

It will be appreciated that by providing the proengagement camming flyweights with a greater mass than the disengagement flyweights, the ratcheting reengagement of the starter turbine clutch member and the turbine engine clutch member can be accomplished at any turbine engine rotational speeds after a turbine engine flameout deceleration. The heavier proengagement flyweights will very quickly cam the starter turbine clutch member into engagement with the turbine engine clutch member at substantially the instant that the two clutch members are rotating at the same speed. The reinforcement of the clutch members when they are engaged allows use of the large mass proengagement flyweights without resulting in damaging axially directed forces which could otherwise damage bearings. It will be understood that the heavier the proengagement flyweights are, the higher the ratcheting reengagement turbine engine speed that can be obtained This latter advantage is highly desirable in a flameout deceleration condition.

Although the invention has been shown and described with respect to a best mode embodiment exemplary thereof, it should be understood by those skilled in the art that various modifications, changes, omissions and additions in the form and detail thereof may be made without departing from the spirit and scope of the invention.

We claim:

1. A clutch assembly for use in delivering rotational drive torque from a starker turbine to a turbine engine during start up from rest and during restart after flame out of the turbine engine, said clutch assembly comprising:
   a) a first clutch member for connection to the turbine engine so as to rotatably drive the latter when rotatably driven;
   b) a second clutch member for connection to the starter turbine so as to be rotatably driven by the latter, said second clutch member being translationally reciprocally movable toward and away from said first clutch member;
   c) proengagement flyweight means operable by centrifugal force to urge said second clutch member toward said first clutch member when said second clutch member is rotatably driven by the starter turbine;
   d) disengagement flyweight means operable by centrifugal force to urge said second clutch member away from said first clutch member when said first clutch member is rotating; and
   e) said proengagement flyweight means having a greater mass than said disengagement flyweight means so that proengagement forces exerted on said second clutch member are greater than disengagement forces exerted on said second clutch member at any given essentially equal rotational speeds for said turbine engine and said starter turbine.

2. The clutch assembly of claim 1 wherein said proengagement and disengagement flyweight means are spherical bodies, and wherein there are more proengagement spherical bodies than disengagement spherical bodies whereby said greater mass is realized.

3. The clutch assembly of claim 2 wherein said spherical bodies are each disposed in separate races that are inclined at a common angle to the axis of rotation of said clutch members.

4. The clutch assembly of claim 1 wherein said clutch members are each provided with complementary teeth which are formed at a common angle to opposed faces of said clutch members, and further comprising means for twisting said second clutch member about its axis of rotation through a twist angle as said second clutch member is moved toward said first clutch member, which twist angle is greater than said common angle in order to ensure full engagement of the teeth on said first and second clutches.

5. The clutch assembly of claim 4 further comprising reinforcing stop means disposed on a side of said first clutch means distal of said second clutch means, and operable to engage said first clutch means when said clutch teeth on said clutches are engaged, said stop means being operable to stabilize said first clutch means against proengagement forces created by said proengagement flyweight means and said means for twisting.

6. The clutch assembly of claim 4 wherein said greater mass proengagement means is operable to produce relatively prolonged clutch tooth ratcheting prior to reengagement of said clutch teeth.

* * * * *